United States Patent
Duc

(10) Patent No.: US 9,371,446 B2
(45) Date of Patent: Jun. 21, 2016

(54) MONOVINYLAROMATIC POLYMER COMPOSITION COMPRISING A POLYMER MADE FROM RENEWABLE RESOURCES AS A DISPERSED PHASE

(71) Applicant: Total Petrochemicals France, Puteaux (FR)

(72) Inventor: Michel Duc, Pau (FR)

(73) Assignee: Total Petrochemicals France, Puteaux (FR)

( * ) Notice: Subject to any disclaimer, the term of this patent is extended or adjusted under 35 U.S.C. 154(b) by 0 days.

(21) Appl. No.: 13/847,855

(22) Filed: Mar. 20, 2013

(65) Prior Publication Data

US 2013/0289208 A1    Oct. 31, 2013

Related U.S. Application Data

(63) Continuation of application No. 12/593,957, filed as application No. PCT/EP2008/053281 on Mar. 19, 2008, now Pat. No. 8,575,271.

(30) Foreign Application Priority Data

Mar. 30, 2007   (EP) .................................... 07290396

(51) Int. Cl.
   *C08L 25/00*    (2006.01)
   *C08L 67/04*    (2006.01)
   *C08L 51/08*    (2006.01)
   *C08F 279/02*   (2006.01)
   *C08F 283/02*   (2006.01)
   *C08L 25/06*    (2006.01)

(52) U.S. Cl.
   CPC ............... *C08L 67/04* (2013.01); *C08F 279/02* (2013.01); *C08F 283/02* (2013.01); *C08L 25/00* (2013.01); *C08L 25/06* (2013.01); *C08F 2438/02* (2013.01); *C08L 51/08* (2013.01); *C08L 2205/03* (2013.01)

(58) Field of Classification Search
   CPC ... C08F 279/02; C08F 283/02; C08F 2438/02
   USPC ................................................ 525/190, 502
   See application file for complete search history.

(56) References Cited

U.S. PATENT DOCUMENTS

2004/0096469 A1 *   5/2004  Lewis et al. .................... 424/401

FOREIGN PATENT DOCUMENTS

JP        2004196718 A  *  7/2004
WO    WO 2006030951 A1  *  3/2006

OTHER PUBLICATIONS

Yuan et al. ["Macroporous poly(l-lactide) of controlled pore size derived from the annealing of co-continuous polystyrene/poly(l-lactide) blends"—Biomaterials, Elsevier Science Publishers BV., Barking, GB, vol. 25, No. 11, May 2004, pp. 2161-2170].*

Sarazin Pierre et al. ["Morphology control in co-continuous poly(L-lactide)/polystyrene blends: A route towards highly structured and interconnected porosity in poly(L-lactide) materials" Biomacromolecules, vol. 4, No. 6, 2003, pp. 1669-1678].*

* cited by examiner

*Primary Examiner* — Kelechi Egwim
(74) *Attorney, Agent, or Firm* — Albert Shung

(57) ABSTRACT

A monovinylaromatic polymer composition can include a bio-sourced polymer dispersed phase and optionally a rubber dispersed phase. The bio-sourced polymer dispersed phase can be predominantly made of particles having a size of less than 10 μm. The monovinylaromatic polymer composition can be made by admixing a monovinylaromatic monomer, bio-sourced polymer, and optionally rubber at conditions effective to polymerize at least a part of the monovinylaromatic monomer and generate a compatibilizer. The monovinylaromatic polymer composition can be made by admixing a monovinylaromatic monomer, functionalized bio-sourced polymer(s) or mixtures of bio-sourced polymer(s) and functionalized bio-sourced polymer(s), and optionally rubber at conditions effective to polymerize at least a part of the monovinylaromatic monomer. The monovinylaromatic polymer composition can be made by blending, in the molten state, functionalized bio-sourced polymer(s) or mixtures of bio-sourced polymer(s) and functionalized bio-sourced polymer(s) with monovinylaromatic polymer, and optionally rubber.

12 Claims, 2 Drawing Sheets

US 9,371,446 B2

MONOVINYLAROMATIC POLYMER COMPOSITION COMPRISING A POLYMER MADE FROM RENEWABLE RESOURCES AS A DISPERSED PHASE

CROSS-REFERENCE TO RELATED APPLICATIONS

This application is a Continuation of U.S. application Ser. No. 12/593,957, filed on Mar. 4, 2010, which claims the benefit of PCT/EP2008/053281, filed on Mar. 19, 2008, which claims priority from EP 07290396.6, filed on Mar. 30, 2007.

FIELD OF THE INVENTION

The present invention concerns a monovinylaromatic polymer composition comprising a polymer made from renewable resources as a dispersed phase. Common plastic material production draws on fossil (i.e. non-renewable) reserves thus contributing to the depletion of essential and increasingly scare resources for mankind. Beyond recycling used plastic materials or valorising plastic wastes as fuel in incinerators for heat and electricity supply, it is desirable to incorporate some parts of polymers made from renewable resources in conventional plastics coming from petrochemistry. PLA (Poly(lactic acid)) is probably one of the so-called bio-polymers presenting the highest potential in terms of physical and mechanical properties, but also processability, considered as very close to polystyrene' ones. Other bio-sourced polymers may be contemplated, and more especially biodegradable polyesters such as polyhydroxyalkanoates (PHAs)

BACKGROUND OF THE INVENTION

Japanese patent application published on 29 Sep. 2005 under the No JP 2005-264086 describes blends of polystyrene (PS) and PLA in which PLA is the major part.

Japanese patent application published on 18 Jan. 2000 under the No JP 2000-017038 describes an expandable resin having biodegradability. This composition is made essentially of PLA and comprises 25% or less by weight of PS.

U.S. Pat. No. 7,160,948 in example 1 describes a composition as follows: 26.3% by weight of polylactic acid, 26.3% by weight of polymethyl methacrylate, 11.6% by weight of polyolefin and 35.8% by weight of a block copolymer of methyl methacrylate and styrene, said block copolymer comprising 30% of PS. This means clearly that the polystyrene is not the major part of the composition.

Japanese patent application published on 8 Dec. 2005 under the No JP 2005-336666 describes lactic acid fibers containing by weight 3 to 15% of syndiotactic polystyrene.

WO 92-04413 describes blends of PLA and general purpose polystyrene comprising by weight 10 to 25% of PLA. These blends are made by compounding PLA and PS, no structure is described. Because there is no compatibilizer and/or no functionalization of the PLA the PLA is not finely dispersed in the PS matrix and thus mechanical properties are poor.

It has now been discovered monovinylaromatic polymer compositions comprising a finely dispersed phase of at least one polymer made from renewable resources. Said polymer made from renewable resources can be selected from poly(α-hydroxyacids) and polyhydroxyalkanoates. Among these latters, polylactic acid (PLA), poly-3-hydroxybutyrate (P3HB), polyhydroxyvalerate (PHV), polyhydroxyhexanoate (PHH), polyhydroxyoctanoate (PHO) and their copolymers are mostly preferred. Most preferably, PLA is used as the bio-sourced dispersed polymer phase. Said compositions can be made as follows:

by blending functionalized bio-sourced polymers, or mixtures of bio-sourced polymers and functionalized bio-sourced polymers, with monovinylaromatic polymer; or by polymerizing monovinylaromatic monomer in the presence of functionalized bio-sourced polymers, or mixtures of bio-sourced polymers and functionalized bio-sourced polymers; or by polymerizing monovinylaromatic monomer in the presence of bio-sourced polymers and at conditions effective to generate a compatibilizer of bio-sourced polymers and monovinylaromatic polymer.

Optionally these compositions comprise a rubber.

BRIEF DESCRIPTION OF THE INVENTION

The present invention concerns a monovinylaromatic polymer composition comprising a bio-sourced polymer dispersed phase and optionally a rubber dispersed phase wherein said bio-sourced polymer dispersed phase is predominantly made of particles having a size of less than 10 μm.

In an advantageous embodiment the particles of the bio-sourced polymer dispersed phase have predominantly a size from 0.1 to 4 μm, more advantageously from 0.1 to 3 μm.

In another advantageous embodiment the particles of the bio-sourced polymer dispersed phase have predominantly a size from 0.1 to 2 μm.

In another embodiment, the particles of the bio-sourced polymer dispersed phase have predominantly a size from 0.1 to 1 μm, more advantageously from 0.1 to 0.7 μm.

The bio-sourced polymer particles can contain monovinylaromatic polymer inclusions, which means any bio-sourced polymer particle may contain itself at least one sub-particle of monovinylaromatic polymer.

In the optional case where a rubber has been incorporated in the initial formulation, the rubber and bio-sourced polymer phases are present as independent particles characterized by a more or less spherical shape and dispersed within the PS continuous phase. Both the rubber and bio-sourced particles may contain at least one sub-particle of occluded vinyl aromatic polymer. Rubber and bio-sourced polymer particles containing a single encapsulated sub-particle of vinyl aromatic polymer—also called "occlusion"—are typically referred as capsule or "core-shell" particles, whereas those containing at least 2 vinylaromatic occluded particles are of the so-called "salami" morphology type. These two types of dispersed phase morphologies can be encountered whatever the dispersed phase considered in the product obtained according to the present invention. Depending on the level of grafting of both the bio-sourced polymer and the optional rubber, core-shell, salami or other morphologies (e.g. labyrinths, onions, rods, droplets . . . ) may be generated.

The present invention also relates to a process (hereunder referred as the first process) to make said monovinylaromatic polymer composition, said process comprising admixing:

a monovinylaromatic monomer, at least one bio-sourced polymer advantageously chosen from the above mentioned polyhydroxy acids and polyhydroxyalkanoates, optionally a rubber, at conditions effective to polymerize at least a part of the monovinylaromatic monomer and generate a compatibilizer of the bio-sourced polymer(s) and the monovinylaromatic polymer.

The present invention also relates to a process (hereunder referred as the second process) to make said monovinylaromatic polymer composition, said process comprising admixing:
a monovinylaromatic monomer,
at least one functionalized bio-sourced polymer, or mixtures of at least one bio-sourced polymer and functionalized bio-sourced polymer(s),
optionally a rubber,
at conditions effective to polymerize at least a part of the monovinylaromatic monomer.

The present invention also relates to a process (hereunder referred as the third process) to make said monovinylaromatic polymer composition, said process comprising blending in the molten state at least one functionalized bio-sourced polymer (or mixtures of bio-sourced polymers and functionalized bio-sourced polymers) with monovinylaromatic polymer, said monovinylaromatic polymer comprising optionally a rubber.

According to a second embodiment the present invention also relates to a process (hereunder referred as the first process of the second embodiment) to make a monovinylaromatic polymer composition comprising a bio-sourced polymer dispersed phase and optionally a rubber dispersed phase, said process comprising admixing:
a monovinylaromatic monomer,
at least one bio-sourced polymer,
optionally a rubber,
at conditions effective to polymerize at least a part of the monovinylaromatic monomer and generate a compatibilizer of the bio-sourced polymer(s) and the monovinylaromatic polymer.

According to a second embodiment the present invention also relates to a process (hereunder referred as the second process of the second embodiment) to make a monovinylaromatic polymer composition comprising a bio-sourced polymer dispersed phase and optionally a rubber dispersed phase, said process comprising
admixing:
a monovinylaromatic monomer,
at least one functionalized bio-sourced polymer, or mixtures of at least one bio-sourced polymer and functionalized bio-sourced polymer(s),
optionally a rubber,
at conditions effective to polymerize at least a part of the monovinylaromatic monomer.

According to a second embodiment the present invention also relates to a process (hereunder referred as the third process of the second embodiment) to make a monovinylaromatic polymer composition comprising a bio-sourced polymer dispersed phase and optionally a rubber dispersed phase, said process comprising blending in the molten state at least one functionalized bio-sourced polymer (or mixtures of bio-sourced polymers and functionalized bio-sourced polymers) with monovinylaromatic polymer, said monovinylaromatic polymer comprising optionally a rubber.

DETAILED DESCRIPTION OF THE INVENTION

Figure 1:
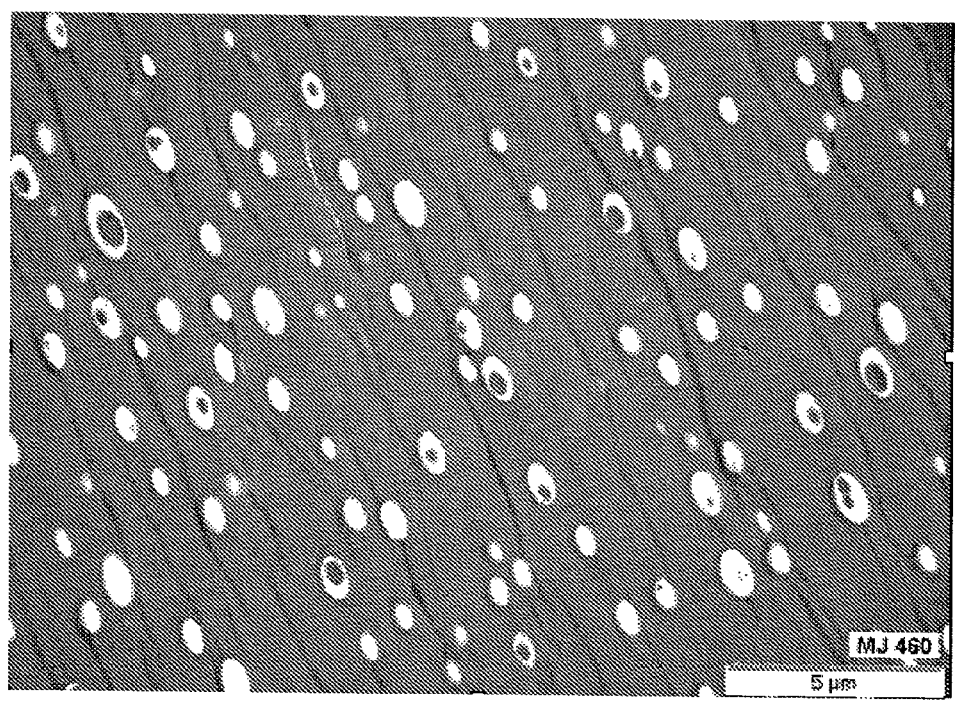
FIG. 1 depicts a transmission electron microscopy image of the polymer composition according to one or more embodiments.

As regards the size of the particles, by predominantly is meant advantageously greater than 50% of the particles in surface, as measured by laser granulometry. Preferably predominantly means greater than 70% and more preferably more than 90%.

Advantageously the weight proportions of the monovinylaromatic polymer composition are:
50 to 99% of monovinylaromatic polymer,
1 to 50% of bio-sourced polymer,
0 to 35% of rubber,
with the condition that the proportions of bio-sourced polymer+rubber is 1 to 50% for respectively 99 to 50% of monovinylaromatic polymer.

Preferably the weight proportions of the monovinylaromatic polymer composition are:
70 to 99% of monovinylaromatic polymer,
1 to 30% of bio-sourced polymer,
0 to 25% of rubber,
with the condition that the proportions of bio-sourced polymer+rubber is 1 to 30% for respectively 99 to 70% of monovinylaromatic polymer.

More preferably the weight proportions of the monovinylaromatic polymer composition are:
80 to 99% of monovinylaromatic polymer,
1 to 20% of bio-sourced polymer,
0 to 15% of rubber,
with the condition that the proportions of bio-sourced polymer+rubber is 1 to 20% for respectively 99 to 80% of monovinylaromatic polymer.

More preferably the weight proportions of the monovinylaromatic polymer composition are:
80 to 95% of monovinylaromatic polymer,
5 to 20% of bio-sourced polymer,
0 to 15% of rubber,
with the condition that the proportions of bio-sourced polymer+rubber is 5 to 20% for respectively 95 to 80% of monovinylaromatic polymer.

These proportions concern the monovinylaromatic polymer composition comprising a bio-sourced polymer dispersed phase and optionally a rubber dispersed phase wherein said bio-sourced polymer dispersed phase is predominantly made of particles having a size of less than 10 μm as well as the various advantageous and preferred particles size ranges cited above. These proportions also concern the monovinylaromatic polymer compositions comprising a bio-sourced polymer dispersed phase and optionally a rubber dispersed phase made according to the second embodiment of the invention.

In addition to the monovinylaromatic polymer, the bio-sourced polymer and the rubber, the monovinylaromatic polymer composition of the invention can comprise additives. Exemplary additives include fillers such as chain transfer agents, talc or any mineral filler organoclays (clays wetted by an organic compatibilizer), anti-oxidants, UV stabilizers, lubricants, mineral oil, silicon oil, vegetable oil, PE, PP or PTFE waxes, plasticizers, pigments, carbon black, flame retardants and the like. Any additive known to be useful in monovinylaromatic polymers to those of ordinary skill in the art of such polymers can be used within the present invention.

As regards the monovinylaromatic monomer, it relates to any aromatic bearing a vinyl function. By way of example, mention may be made of styrene, vinyl toluene, alphamethylstyrene, alphaethylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert.-butyl-3-styrene, dichloro-2,4-styrene, dichloro-2,6-styrene, vinyl-1-naphtalene and vinylanthracene. It would not depart from the scope of the invention to use more than one monovinylaromatic monomer. A part of the monovinylaromatic monomer may be replaced by unsaturated monomers copolymerizable with styrene. By way of example mention may be made of alkyl esters of acrylic or methacrylic acid, acrylonitrile and methacrylonitrile. The proportion of comonomer may be from 0 to 50% by weight for respectively 100 to 50% of the monovinylaromatic monomer. In a specific embodiment the monovinylaromatic polymer comprises:

i) from 60 to 100 weight % of one or more $C_{8-12}$ monovinylaromatic monomers; and
ii) from 0 to 40 weight % of one or more monomers selected from the group consisting of $C_{1-4}$ alkyl esters of acrylic or methacrylic acid and acrylonitrile and methacrylonitrile.

As regards the bio-sourced polymers, it can be any polymer made by a natural or synthetic route from renewable resources. By way of example any polymer made by a natural or synthetic route from renewable resources and belonging to polyhydroxy acids or polyhydroxyalkanoates and their copolymers can be considered, provided they contain per addition unit at least one labile hydrogen atom bonded to a carbon atom in the α-position of an oxygen atom and/or a carbonyl group. The general formula of the claimed bio-sourced polymers can be depicted as below:

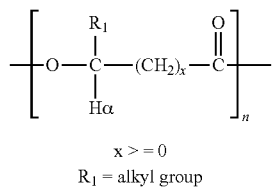

x >= 0
$R_1$ = alkyl group

Bio-sourced polymers should be preferably chosen among polylactic acids and polyhydroxybutyrates. PLA is the most preferred bio-sourced polymer. Advantageously high-Mw (>100,000) PLA is used. High-Mw (>100,000) PLA is a commercially available bio-sourced polymer manufactured by Ring Opening Polymerization of lactide. Lactide is the product of thermal dimerization of lactic acid, itself produced by fermenting pure (glucose, saccharose, lactose . . . ) or impure (starch, molasses, lactoserum . . . ) natural carbon substrates. PLA general formula is:

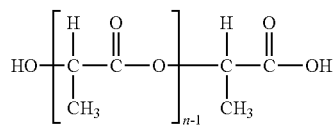

D,L- or L,L-poly(lactic acids) can both be used in the framework of the present invention.

As regards the rubber, mention may be made of EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene, isoprene-acrylonitrile copolymer, SBR (Styrene butadiene rubber), styrenic block copolymers with a hydrogenated midblock of styrene-ethylene/butylene-styrene (SEBS) or styrene-ethylene/propylene-styrene (SEPS), and any copolymer having styrene blocks. More particularly the copolymers having styrene blocks are advantageously copolymers with styrene blocks and blocks made of butadiene or isoprene or of a mixture butadiene/isoprene. These block copolymers can be linear block copolymers or star block copolymers, hydrogenated and/or functionalized. These copolymers are described in ULLMANN'S ENCYCLOPEDIA OF INDUSTRIAL CHEMISTRY, fifth edition (1995) Vol A26, pages 655-659. They are sold by Total Petrochemicals under the trade mark Finaclear®, by BASF under the trade mark Styrolux®, by Kraton under the trade name of Kraton® D, and under the trade mark K-Resin® by Chevron Phillips Chemical.

By way of example the rubber can be selected from the group consisting of:
a) co- and homopolymers of $C_{4-6}$ conjugated diolefins,
b) copolymers comprising from 60 to 85 weight % of one or more $C_{4-6}$ conjugated diolefins and from 15 to 40 weight % of a monomer selected from the group consisting of acrylonitrile and methacrylonitrile and
c) copolymers comprising from 20 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-6}$ conjugated diolefins. The rubber may be prepared by a number of methods, preferably by emulsion or solution polymerization. These processes are well known to those skilled in the art. It would not depart from the scope of the invention to use more than one rubber.

The monovinylaromatic polymer compositions of the present invention are useful as environmental-friendly substitutes of general purpose monovinylaromatic polymer (by way of example GPPS) or high-impact monovinylaromatic polymer (by way of example HiPS), insofar as they incorporate a fraction of material made from renewable resources. They may be foamed, extruded & thermoformed or injected & moulded to form articles similar to those commonly made of GPPS, HIPS, or ABS. More particularly, they can be wisely used for making food packagings or disposable items which can be burnt after use for producing heat or electricity. In that case, the green-house gas balance is more favourable compared to conventional styrenic polymers as a part of the material was made from vegetable-origin resources and $CO_2$ was captured from the atmosphere during their cultivation.

As regards the first process to make said monovinylaromatic polymer composition, said process comprising admixing:
a monovinylaromatic monomer,
at least one bio-sourced polymer,
optionally a rubber,
at conditions effective to polymerize at least a part of the monovinylaromatic monomer and generate in situ a compatibilizer of the bio-sourced polymer and the monovinylaromatic polymer. It can be carried out in a conventional manner by bulk polymerization, solution polymerization, or polymerization in aqueous dispersion, the bio-sourced polymer (or the bio-sourced polymer and the rubber) first being dissolved in the polymerizable monomer, this solution being then subjected to polymerization in the possible presence of a radical initiator. Advantageously the process of the invention is carried out as a diluted bulk polymerization process. When using diluted bulk polymerization, the starting solution may be mixed with up to about twenty percent (20%) by weight, based on the monovinylaromatic monomer employed, of an inert solvent so as to lower the polymerization bulk viscosity, to moderate polymerization heat and to improve thermal exchanges and heat homogeneity within the bulk. Suitable diluents include aromatic solvents such as ethylbenzene, toluene, xylenes, cyclohexane, and aliphatic hydrocarbon solvents, such as dodecane, and mixtures thereof. The diluent can also consists of a mixture of the abovementioned solvents, or a mixture of one of these solvents with the vinylaromatic monomer used for the purpose of the present invention. In that latter case, the diluent is typically made of recycled solvent and unreacted vinylaromatic monomer, often referred as "recycles". Any solvent useful to improve heat homogeneity within the bulk during polymerization, that can be removed after polymerization of the monovinylaromatic monomer, and that does not interfere with the polymerization of the monovinylaromatic monomer and the optional comonomer(s), can be used with the process of the present invention.

Suitable chain transfer agents, e.g. mercaptans or alphamethyl styrene dimer, may also be added to control polymer molecular weight and the bio-courced polymer and optional rubber particle sizes.

The bio-sourced polymer (or the bio-sourced polymer and the rubber) is "dissolved" in the monovinylaromatic monomer (actually the rubber is infinitely swollen with the monomer). Monovinylaromatic polymer is initially formed from the monovinylaromatic monomer within the homogeneous bio-sourced polymer (or bio-sourced polymer and rubber) solution in monovinylaromatic monomer. At the beginning of the polymerization the reacting solution is at a point prior to the bio-sourced polymer (or bio-sourced polymer and rubber)/monovinylaromatic monomer inversion point, i.e. the point at which the solution being reacted goes from monovinylaromatic polymer particles in a bio-sourced polymer (or bio-sourced polymer and rubber)/monovinylaromatic monomer matrix to bio-sourced polymer (or bio-sourced polymer and rubber) particles in a monovinylaromatic polymer matrix. In other words when the monovinylaromatic polymer phase volume fraction approximately equals the bio-sourced polymer (or bio-sourced polymer and rubber) phase volume fraction, a phase inversion occurs e.g. the monovinylaromatic monomer/monovinylaromatic polymer phase becomes continuous and the bio-sourced polymer (or bio-sourced polymer and rubber) phase becomes discontinuous.

When there is no rubber, monovinylaromatic monomer is polymerized around and within the bio-sourced polymer particles which leads to monovinylaromatic polymer inclusions in the bio-sourced polymer particles.

A portion of the monovinylaromatic monomer is polymerized by grafting on the bio-sourced polymer (or bio-sourced polymer and rubber) due to the presence in the bio-sourced polymer macromolecules of labile hydrogen atoms that can be easily abstracted in the presence of active radicals (possibly coming from the initiator). Hydrogen atoms-abstraction from bio-sourced polymer macromolecules results in the in situ production of bio-sourced polymer-grafted-monovinylaromatic copolymers that act as emulsifier for the bio-sourced polymer-in-monovinylaromatic monomer phase dispersed within the monovinylaromatic polymer-in monovinylaromatic monomer continuous phase. These bio-sourced polymer-grafted-monovinylaromatic copolymers are compatibilizers of the bio-sourced polymer and monovinylaromatic polymer.

This process leads to bio-sourced polymer dispersed phase morphologies very similar to the rubber phase morphologies that can be obtained in convention HiPS (High Impact Polystyrene) process: depending on the bio-sourced polymer grafting level, bio-sourced polymer morphologies can consists of salami-like or capsule (core-shell) particles. The bio-sourced polymer grafting level can be easily adjusted by introducing in the polymerization bulk adapted initiators or grafting promoters, such as organic peroxides (e.g. 1,1-di-(t-butylperoxy)cyclohexane; 1,1-di-(t-amylperoxy)cyclohexane); 1,1-di-(t-butylperoxy)-3,3,5-trimethyl-cyclohexane; 00-t-amyl-0-(2-ethylhexyl monoperoxy-carbonate); OO-t-butyl O-isopropyl monoperoxy-carbonate; OO-t-butyl-0-(2-ethylhexyl)monoperoxy-carbonate; butyl 4,4-di(t-butylperoxy)valerate; Ethyl 3,3-Di-(t-butylperoxy)butyrate; and mixtures thereof), hydroperoxides, singlet-oxygen ($^1O_2$) or amine-complexed boranes possibly in combination with the above mentioned peroxides. Grafting promoter amounts are typically within the 0-1000 ppm range.

When the rubber is present, most of the bio-sourced polymer generates a secondary population of dispersed particles. These dispersed bio-sourced polymer particles may entrap at least one occluded PS sub-particles and exhibit the particle inner morphologies typically encountered in the conventional HIPS process, e.g. salami, capsule, labyrinth, rod or droplet morphologies.

In this specific process, the compositions of the invention can be produced batchwise or continuously in a series of continuously tank reactors and/or plug-flow reactors; the reactor wherein phase inversion occurs being called "inversion reactor". The reactors downstream of the inversion reactor allow the vinylaromatic monomer polymerization to proceed further until a solid content sufficiently high (typically 60-90% wt) for degassing the composition of the invention using the conventional flash-devolatilization or vacuum-extrusion technologies. A styrenic composite material containing a part of bio-sourced polymer is obtained therefrom.

As regards the second process to make said monovinylaromatic polymer composition, said process comprising admixing:
a monovinylaromatic monomer,
functionalized bio-sourced polymer, or mixtures of bio-sourced polymer and
functionalized bio-sourced polymer,
optionally a rubber,
at conditions effective to polymerize at least a part of the monovinylaromatic monomer, the main difference with the first process is the use of a functionalized bio-sourced polymer, or mixtures of bio-sourced polymer and functionalized bio-sourced polymer. Other conditions are similar. The use of radical initiators such as peroxides is optional. This functionalized bio-sourced polymer is any modified bio-sourced polymer which leads to the in situ production of bio-sourced polymer-grafted-monovinylaromatic copolymers when said modified bio-sourced polymer is in contact with monovinylaromatic monomer under conditions effective to polymerize at least a part of said monovinylaromatic monomer. This modified bio-sourced polymer may be referred also as bio-sourced polymer macro-initiator. They are prepared prior to the admixing with the monovinylaromatic monomer. By way of example said functionalized bio-sourced polymer can be prepared by reacting the bio-sourced polymer with:
i) functionalized alkoxyamines,
ii) functionalized comonomers, such as acrylic acid, methacrylic acid, acrylates, methacrylates, vinyl alcohol, vinyl phosphonic acid, methacryloyl chloride, maleic anhydride, etc.
iii) functionalised chain transfer agents,
iv) functionalized organic initiators (for instance, Akzo V50 azo-initiator),
v) mixtures of organic peroxides generating during thermal decomposition H-abstracting radicals; and nitroxyl stable free radicals, in an adapted solvent.

Functionalized alkoxyamines (i) are molecules bearing at least:
  a) one chemical function able to react readily with the bio-sourced polymer alcohol and/or carboxyl acid end-groups;
  b) an alcoxyamine function that can decompose and generate an active radical group when heated above about 60° C. combined with a stable nitroxyl radical. The so-called active radical can initiate styrenic monomer polymerization.

Examples of suitable alcoxyamines are depicted below:

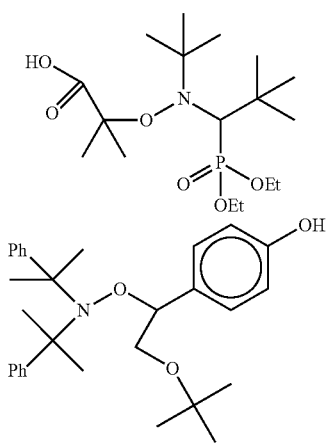

Alcoxyamines from Arkema's BlocBuilder™ commercial range, such as (2), can be advantageously used for chemically converting the bio-sourced polymer into a macroinitiator.

Functionalised chain transfer agents (iii) are molecules bearing at least: one chemical function able to react readily with the bio-sourced polymer alcohol and/or carboxyl acid end-groups;
a functional group able to undergo radical chain transfer reactions with (macro) radicals during styrene polymerization.
Examples of suitable chain transfer agents are: mercapto-ethanol, mercapto-acetic acid, mercapto-ethylamine hydrochloride, etc. . . .

About (v), this specific process takes advantage of the presence in the bio-sourced polymer macromolecules of labile hydrogen atoms that can be easily abstracted in the presence of active radicals (see Scheme (2) below for PLA used as an illustration model). The resulting bio-sourced polymer macro-radicals are trapped by Nitroxyle counter-radicals to form dormant bio-sourced polymer macro-initiators that can be activated by heat.

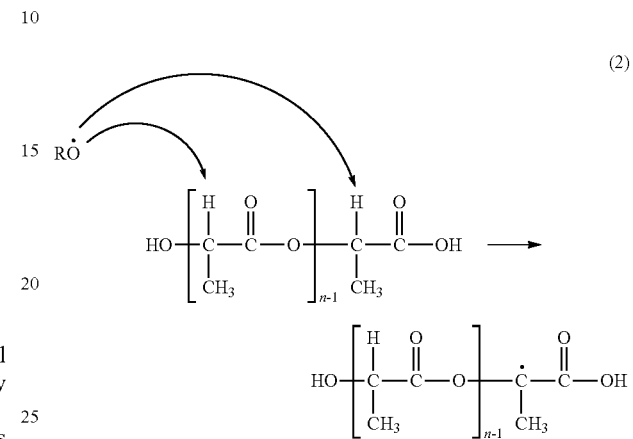

In all cases, the resulting functionalized bio-sourced polymer chains exhibit at least one radical-active function. A radical-active function is a reactive group able to generate one or several reactive radicals above a given temperature and/or in the presence of radicals. In the example described below, the radical-active function is an alcoxyamine group and the considered bio-sourced polymer is PLA:

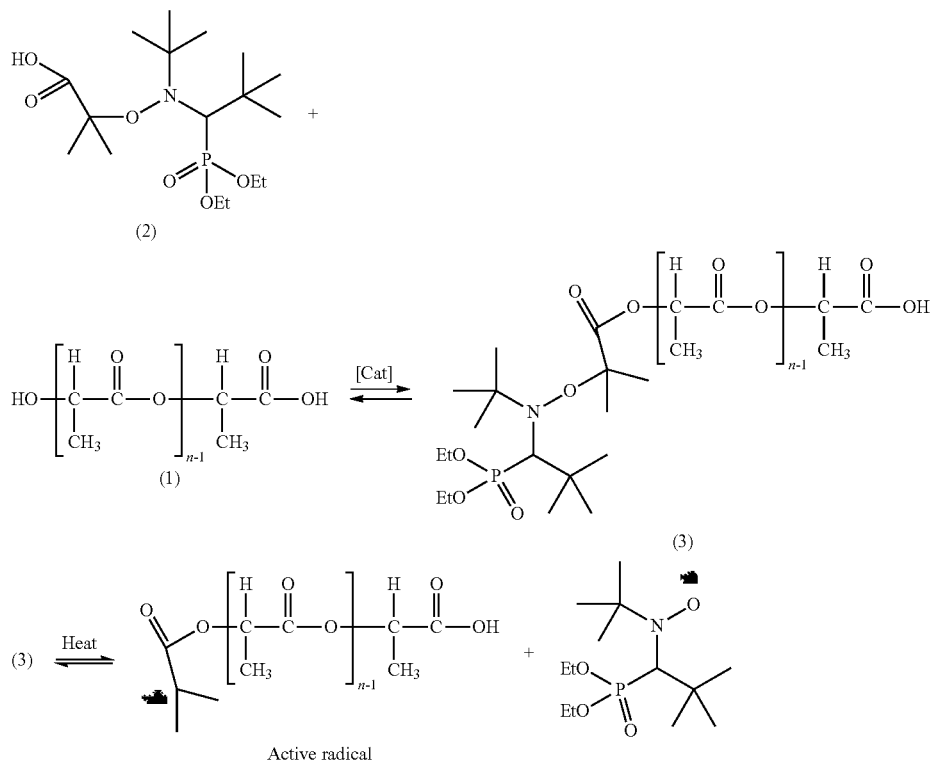

The bio-sourced polymer dispersed phase get stabilized as monovinylaromatic polymer-block-bio-sourced polymer (-block-monovinylaromatic polymer) is formed in situ in the reactor.

It would not depart from the scope of the invention to replace, in whole or in part, the functionalized bio-sourced polymer by a blend of the bio-sourced polymer and a block copolymer having at least a block consisting essentially of poly(alkylmethacrylate) or poly(alkylacrylate) and at least a block consisting essentially of a monovinylaromatic polymer. Example of alkylmethacrylate is methylmethacrylate, example of alkylacrylate is methylacrylate. By way of example, copolymers having polystyrene blocks and PMMA (polymethylmethacrylate) blocks are described in U.S. Pat. No. 5,264,527 and EP 1085029 the content of which are incorporated in the present application. By way of example, copolymers having a polystyrene block, a polybutadiene block and a PMMA block are described in U.S. Pat. No. 7,144,952, the content of which is incorporated in the present application.

As regards the third process to make said monovinylaromatic polymer composition, said process comprising blending in the molten state functionalized bio-sourced polymer (or mixtures of bio-sourced polymer and functionalized bio-sourced polymer) with monovinylaromatic polymer, said monovinylaromatic polymer comprising optionally a rubber. Optionally styrene and peroxide grafting promoters can be introduced.

The bio-sourced polymer dispersed phase get stabilized as monovinylaromatic polymer-block-bio-sourced polymer (-block-monovinylaromatic polymer) is formed in situ in the reactive extruder or in any suitable melt-blending device.

As regards the second embodiment of the invention, all the process conditions already described above; the monovinylaromatic monomer; the rubber; the additives; the bio-sourced polymer; the proportions of monovinylaromatic polymer, bio-sourced polymer and rubber; the functionalized bio-sourced polymer and operating conditions are available in said second embodiment.

EXAMPLES

Example 1

PS-PLA "Reactor Blend" Produced in the Presence of a PLA-Grafted-PS Compatibilizer Prepared in a Separate Process Prior to Styrene Radical Polymerization 150 µmol of benzoyl peroxide (BPO 75% wt commercial solution –0.050 g) and 86 µmol (0.044 g) of stable free nitroxyl radicals Prostab 5415 from Ciba Specialties are added to a 20% wt PLA (TERRAMAC™ TE-4000 from Unitika, 50 g) solution in dichloroethane (400 g). The solution is then heated and maintained under vigorous agitation at 80° C. for 3 hours. The resulting polymer containing some parts of nitroxyle-functionalized PLA chains is subsequently precipitated in methanol, filtered and dried under primary vacuum at room temperature. 70 g (10% wt) of this partly modified PLA were dissolved for 3 hours at 80° C. in styrene (602 g, 86% wt) and ethylbenzene (28 g, 4% wt). When dissolution was completed, the PLA in styrene and EB solution was transferred into a 1.5 liter continuously stirred batch reactor. 0.530 g (500 ppm) of a 75% wt solution of isopropyl peroxycarbonate in isododecane were then added and the solution temperature was raised to 125° C. so as to allow styrene to polymerize. When solid content reached 60% wt, the polymer solution was poured in alumina panels and heated at 150° C. for 3 hours and 180° C. for 2 hours in an oven for polymerization finishing. The final polymer composite was submitted to laser granulometry and transmission electron microscopy analyses. The composite material appeared to consist of a dispersion of 1.1 µm (D50 surface) PLA capsule particles in a PS matrix (see FIG. 1). In FIG. 1 the white particles (capsules) are in PLA, some of them contain inclusions of polystyrene (in grey).

Example 2

PS-PLA "Reactor Blend" with PLA-Grafted-PS Compatibilizer Formed In Situ During Styrene Radical Polymerization 1100 g of PLA (TERRAMAC™ TE-4000 from Unitika) were pre-dried at 100° C. for 4 hours prior to being dissolved under vigorous agitation for 2 hours at 90° C. in a 20 liter batch reactor containing 9460 g styrene monomer and 440 g ethylbenzene. Once dissolution was complete, 8.25 g (750 ppm as it is) of a 75% wt isopropyl peroxycarbonate solution in isododecane were injected and the whole solution was set to polymerize at 120° C. until a 65% wt solid content was reached. The reaction bulk was then preheated and degassed in a flash-devolatilizer at 230° C. and 43 torrs. The resulting polymer composite was finally extruded and pelletized. Laser granulometry and transmission electron microscopy analyses revealed that the PS-PLA composite material consisted of a dispersion of 0.4 µm capsule-like PLA particles in PS. Rheological and mechanical properties are tabulated below:

| | Product | Commercial GPPS Total Petrochemicals 1450N | PS-PLA Reactor Blend of Example 2 |
|---|---|---|---|
| Melt Rheology @ 200° C. | MFI (gr/10 min) | 6.5 | 9.6 |
| | $[\eta]_0$ (Pa · s) | 4950 | 8100 |
| | $[\eta]$ @ 10 $s^{-1}$ (Pa · s) | 2240 | 2200 |
| | $[\eta]$ @ 100 $s^{-1}$ (Pa · s) | 670 | 610 |
| Elongational Rheology | Melt-Strength, Fmax (N) | 0.128 | 0.114 |
| | Max. take-Up Speed (m/min) | 250 | 184 |
| Thermal Properties | Vicat 50N (° C.) | 100.2 | 100.0 |
| Mechanical Properties | Unnotched Charpy (kJ/$m^2$) | 9.1 | 8.0 |
| | Reversion (%) | 35 | 36.7 |
| | Flex. Modulus (MPa) | 3280 | 3216 |
| | Deformation @ Brk under flexion (%) | 2.2 | 1.7 |

The thus obtained PS-PLA polymer composite exhibited properties very similar to a commercial general purpose PS of equivalent melt-flow index (see Scheme (5)), except for transparency, the composite being opaque.

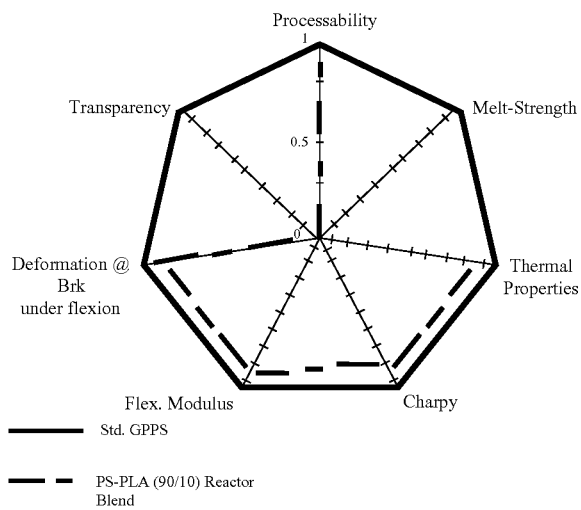

Example 3

Figure 2:
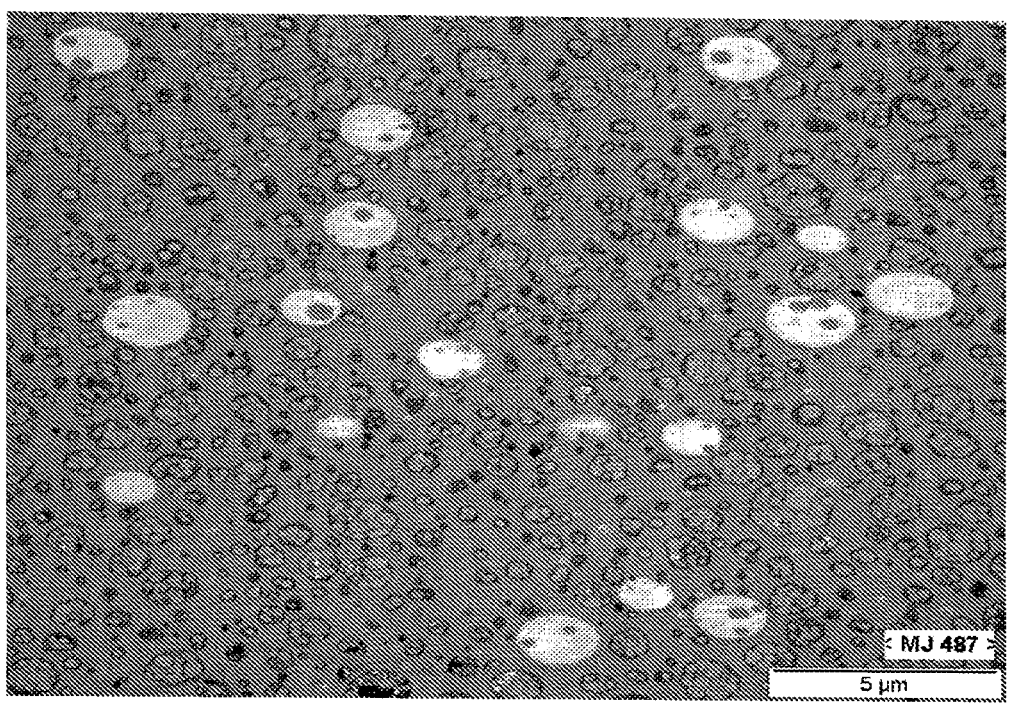
FIG. 2 depicts another transmission electron microscopy image of the polymer composition according to one or more embodiments.

HiPS-PLA "Reactor Blend" with PLA-Grafted-PS and Polybutadiene-Grafted-PS Compatibilizers Formed Both In Situ During Styrene Radical Polymerization 35 g (5% wt) of pre-dried commercial PLA from Unitika (TERRAMAC™ TE-4000) were dissolved for 3 hours at 80° C. in a 6% wt polybutadiene rubber (CB 528 T low-cis rubber supplied by Lanxess) in solution in styrene (42 g of polybutadiene dissolved into 563.5 g of commercial styrene monomer) and ethylbenzene (42 g, 6% wt). When dissolution was completed, the PLA in styrene and EB solution was transferred into a 1.5 liter continuously stirred batch reactor. 0.140 g (200 ppm) of a 75% wt solution of isopropyl peroxycarbonate in isododecane and 0.470 g (670 ppm) of Irganox 1076 antioxidant (supplied by Ciba Specialties) were then added and the solution temperature was raised to 125° C. so as to allow styrene to polymerize. When solid content reached 50% wt, the polymer solution was poured in alumina panels and heated at 150° C. for 3 hours and 180° C. for 2 hours in an oven for polymerization finishing. The final polymer composite was submitted to laser granulometry and transmission electron microscopy (TEM) analyses. The composite material appeared to consist of a dispersion of 1.3 μm (D50 surface) polybutadiene and PLA particles in a PS matrix. The TEM analysis revealed that both the rubber and PLA dispersed phases were made of particles characterized by the so-called salami morphology (see FIG. 2).

TEM photo (OsO4 used to tint the rubber)

In (deep) dark: polybutadiene rubber.

In grey: polystyrene, the matrix.

In white: PLA, said PLA contain one or more PS inclusions.

There are other particles, not white and not black: These are particles of the salami type made of polybutadiene rubber and completely filled with PS inclusions. Said PS inclusions are of a lighter grey than the grey of the matrix.

The invention claimed is:

1. A process for the production of a polymer composition comprising: admixing a monovinylaromatic monomer; and at least one bio-sourced polymer; under conditions effective to polymerize at least a part of the monovinylaromatic monomer and generate a compatibilizer of the bio-sourced polymer and monovinylaromatic polymer; wherein the polymer composition comprises a bio-sourced polymer dispersed phase and a monovinylaromatic polymer continuous phase, wherein the bio-sourced polymer dispersed phase is predominantly made of particles having a size of less than 10 μm, and wherein the bio-sourced polymer dispersed phase is characterized by the formula:

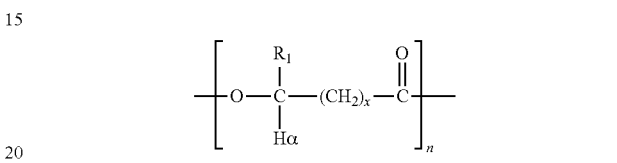

wherein x is ≥0, and wherein $R_1$ is an alkyl group.

2. The process of claim 1, further comprising admixing rubber to the monovinylaromatic monomer and at least one bio-sourced polymer, wherein the polymer composition comprises a rubber dispersed phase.

3. The process of claim 1, wherein the particles of the bio-sourced polymer dispersed phase have predominantly a size from 0.1 to 4 μm.

4. The process of claim 1, wherein the particles of the bio-sourced polymer dispersed phase have predominantly a size from 0.1 to 2 μm.

5. The process of claim 1, wherein the particles of the bio-sourced polymer dispersed phase have predominantly a size from 0.1 to 1 μm.

6. The process of claim 1, wherein the particles of the bio-sourced polymer dispersed phase have predominantly a size from 0.1 to 0.7 μm.

7. The process of claim 1, wherein the weight proportions of the polymer composition comprise 50% to 99% of monovinylaromatic polymer and 1% to 50% of bio-sourced polymer.

8. The process of claim 2, wherein the rubber dispersed phase ranges from 0 wt % to 35 wt % of the polymer composition.

9. The process of claim 2, wherein the rubber dispersed phase and bio-sourced polymer together comprise from 1 wt % to 50 wt % of the polymer composition.

10. The process of claim 2, wherein the weight proportions of the polymer composition are: 50 to 99% of monovinylaromatic polymer; 1 to 50% of bio-sourced polymer; and 0 to 35% of rubber; wherein the weight proportion of the bio-sourced polymer plus the rubber ranges from 1 to 50%, with the balance being monovinylaromatic polymer.

11. The process of claim 1, wherein the bio-sourced polymer is selected from a group comprising polyhydroxyacids, polyhydroxyalkanoates, and combinations thereof.

12. The process of claim 1, wherein the bio-sourced polymer is selected from a group comprising poly(lactic acid), polyhydroxybutyrate, polyhydroxyvalerate, polyhydroxyhexanoate, polyhydroxyoctanoate, and combinations thereof.

* * * * *